United States Patent [19]

Jackson, Jr. et al.

[11] 4,093,603

[45] June 6, 1978

[54] COPOLYESTERS OF TEREPHTHALIC ACID, 1,2-PROPANEDIOL AND 1,4-CYCLOHEXANEDIMETHANOL

[75] Inventors: Winston J. Jackson, Jr.; Herbert F. Kuhfuss, both of Kingsport, Tenn.

[73] Assignee: Eastman Kodak Company, Rochester, N.Y.

[21] Appl. No.: 760,778

[22] Filed: Jan. 19, 1977

[51] Int. Cl.$^2$ ............................................. C08G 63/18
[52] U.S. Cl. ................................. 260/75 R; 260/47 C
[58] Field of Search ............................ 260/75 R, 47 C

[56] References Cited

U.S. PATENT DOCUMENTS

| | | |
|---|---|---|
| 2,901,466 | 8/1959 | Kibler et al. ........................ 260/75 R |
| 3,436,376 | 4/1969 | Duling ................................ 260/75 R |
| 3,668,275 | 6/1972 | Riemhofer et al. ........... 260/75 R X |
| 3,714,126 | 1/1973 | Reid .................................... 260/75 R |
| 3,725,343 | 4/1973 | Schreyer ....................... 260/75 R X |

*Primary Examiner*—Lucille M. Phynes
*Attorney, Agent, or Firm*—J. Frederick Thomsen; Daniel B. Reece, III

[57] ABSTRACT

Copolyesters of terephthalic acid, 1,2-propanediol and 1,4-cyclohexanedimethanol are useful for film, blown bottle, and plastic applications.

3 Claims, No Drawings

COPOLYESTERS OF TEREPHTHALIC ACID, 1,2-PROPANEDIOL AND 1,4-CYCLOHEXANEDIMETHANOL

This invention relates to the preparation of high molecular weight, tough, flexible polyesters derived from terephthalic acid, 1,2-propanediol, and 1,4-cyclohexanedimethanol. These copolyesters are useful for the manufacture of plastics, films, blown bottles and other shaped objects. The injection-molded copolyesters of this invention are characterized by high toughness and low coefficient of thermal expansion.

Polyesters of terephthalic acid or derivatives of terephthalic acid and 1,2-propanediol are known. See Japanese Pat. No. 47941/73. It has long been recognized that these polyesters are of little use as plastics because of the presence of a secondary as well as a primary hydroxyl group. It is further known that secondary hydroxyl groups react at a slower rate than do primary hydroxyls in condensation reactions and therefore it is difficult to obtain high molecular weight polyesters with secondary glycols. U.S. Pat. No. 2,901,466 discloses polyesters of terephthalic acid or functional equivalents of terephthalic acid such as the alkyl esters, more specifically dimethyl terephthalate and 1,4-cyclohexanedimethanol. Also disclosed is the possibility of utilizing additional modifying amounts of certain glycols other than 1,4-cyclohexanedimethanol such as ethylene glycol, 1,5-pentanediol, 1,10-decanediol, ether glycols such as diethylene glycol, branched chain aliphatic glycols which can be employed are also listed and included, 2,2-dimethyl-1,3-propanediol, 2-methyl-1,5-pentanediol, etc. There is no specific mention in this patent of any polymers prepared from 1,2-propanediol.

The copolyesters of this invention are thought to be unobvious because of the combination of good all-around properties and surprisingly good Izod impact strength of plastics made from the copolyesters of this invention over the combination of properties of polyesters prepared from terephthalic acid and 1,4-cyclohexanedimethanol as disclosed in U.S. Pat. No. 2,901,466 and the polyesters of terephthalic acid and 1,2-propanediol disclosed in Japanese Pat. No. 47941/73. The problems associated with poly(1,4-cyclohexylenedimethylene terephthalate) as a molding plastic are well known. For example, a quote from the Encyclopedia of Polymer Science and Technology, Supplement Volume I, page 446 (1976) follows:

"Because of the high melting point of poly(1,4-cyclohexylenedimethylene terephthalate) (mp 278°–318° C for diol trans contents of 50 to 100%) (14), the polyester requires an injection-molding temperature above 300° C. The processing range, therefore, is very narrow if decomposition is to be avoided. Also, the molded parts are brittle; consequently, this polyester is not used as a molding plastic."

Thus, the combination of highly advantageous physical properties of molded plastics prepared from the copolyesters of this invention result from the combination of a critical range of specific glycols, e.g., 1,2-propanediol and 1,4-cyclohexanedimethanol when condensed with terephthalic acid or a derivative thereof as further exemplified in the examples which follow.

Accordingly, the polyester of this invention can be broadly defined to be comprised of a copolyester of Components 1, 2 and 3 as follows:

1. terephthalic acid or derivatives thereof;
2. from about 30 to about 75 mole percent of 1,4-cyclohexanedimethanol; and
3. from 70 to 25 mole percent of 1,2-propane diol; said copolyester having an inherent viscosity of at least about 0.40 as measured at 25° C. using 0.5 gram of polyester per 100 ml. of a solvent consisting of 60% by volume phenol and 40% by volume tetrachloroethane.

In a preferred embodiment of the invention the glycol component is from 40 to about 70 mole percent of 1,4-cyclohexanedimethanol and from 60 to 30 mole percent 1,2-propanediol. The inherent viscosity of the copolyesters of this invention are preferably at least about 0.6.

As it is well known in the art the 1,4-cyclohexanedimethanol useful in this invention can exist both as a trans and cis isomer. In this invention the 1,4-cyclohexanedimethanol cis/trans ratio may be 0:100 to 100:0 and preferably the commercially available 30:70 cis/trans ratio. As associated with terephthalic acid the term "derivative thereof" is meant to include functional equivalents of terephthalic acid such as the dialkyl esters, more specifically dimethyl terephthalate. The copolyesters of this invention can be prepared by methods for preparing high molecular weight copolyesters well known in the art such as direct condensation or ester interchange. Preferably the copolyesters are prepared by a combination of esterification and ester interchange where the dimethyl ester of terephthalic acid and the glycol components are reacted to form a mixture of the bis ester of 1,4-cyclohexanedimethanol and 1,2-propanediol and then the mixture of bis esters is polycondensed at high temperatures and low pressure to form a high molecular weight polymer through elimination of the 1,2-propanediol and 1,4-cyclohexanedimethanol.

Conventional polyester catalysts may be used to prepare these copolyesters. A satisfactory catalyst system is 130 ppm Zn which may be added as the diacetate, 28 ppm Ti (which may be added as the tetraalkoxide), and a small amount of a phosphorous stabilizer (which may be added as tri(2-ethylhexyl) phosphate.

The polyesters of this invention can contain a wide variety of materials to modify the properties of the copolyester in some particular way. For example, the copolyesters can contain plasticizers, stabilizers, pigments, nucleating agents, fillers, glass fibers, asbestos fibers, antioxidants, fire retardants and other materials commonly used in polymers to be used to modify the properties of copolyesters and polyesters in general. In addition, the polyester can contain an extrusion aid such as pentaerythritol tetrastearate or the bis-stearamide of methylene bis-aniline.

The coefficient of linear thermal expansion of the copolyesters of this invention vary from about 1 to about $4 \times 10^{-5}$ in./in./° C. (determined at $-30°$ to 40° C.), whereas values of $7.3 \times 10^{-5}$ and $7.9 \times 10^{-5}$, respectively, were obtained for poly(tetramethylene terephthalate) and copoly(50/50 1,4-cyclohexylenedimethylene terephthalate/-1,4-cyclohexylenedimethylene isophthalate).

The notched Izod impact strength of poly(1,2-propylene terephthalate) is significantly improved when the polymer is modified with at least 40 to about 60 mole percent of 1,4-cyclohexanedimethanol (see Table 1). The unnotched Izod impact strength is greatly increased when poly(1,2-propylene terephthalate) is modified with at least about 25 to 75 mole percent 1,4-cyclohexanedimethanol (Table 1).

In addition to plastics, the copolyesters of this invention may be fabricated to give other types of shaped objects, such as foamed plastics, blown bottles, films, sheets, extruded shapes, and coatings.

This invention will be further illustrated by the following examples although it will be understood that these examples are included merely for purposes of illustration and are not intended to limit the scope of the invention.

EXAMPLE

All inherent viscosities are determined at 25° C. in 60/40% by volume phenol/tetrachloroethane at a concentration of 0.5 g/100 ml.

The polyesters are dried in an oven at 80° C. overnight and injection molded to give 2½ × ⅜ × 1/16-in. tensile bars and 5 × ½ × ⅛-in. flexure bars for testing. ASTM procedures are used for measuring the tensile strength and elongation (ASTM D1708), flexural modulus (ASTM D790), Izod impact strength (ASTM D256 Method A), and heat-deflection temperature (ASTM D648).

The following describes the preparation of a typical copolyester:

A mixture of 97 g (0.5 mole) dimethyl terephthalate, 87.5 g (1.15 mole) 1,2-propanediol, 50.4 g (0.35 mole) 1,4-cyclohexanedimethanol (30/70 cis/trans ratio), 0.076 g zinc acetate (130 ppm Zn), 1.9 ml of titanium tetraisopropoxide catalyst solution (56 ppm Ti) and 0.02 g of tri(2-ethylhexyl) phosphate is placed in a 500-ml flask equipped with a stirrer, a short distillation head with inlet and outlet for nitrogen. The nitrogen outlet, which is connected to a receiver, has provision for applying vacuum. The mixture is stirred at 180°-190° C. in a nitrogen atmosphere until the ester interchange is completed (three hours). A vacuum of 0.5 mm is then applied at 240° C. for 2 hours. A clear, very light yellow polymer is obtained. The polymer has an inherent viscosity of 0.72 and Tg of 95° C. Pressed films (5.0-mil thickness) of this polymer are clear, tough, and creaseable without breaking. NMR analysis shows the presence of 67 mole percent 1,4-cyclohexanedimethanol.

Using the above process, a series of copolyesters is prepared from dimethyl terephthalate, 1,2-propanediol, and 20-70 mole percent 1,4-cyclohexanedimethanol. Table 1 lists the properties of injection molded test bars molded at 275° C. Also, included are the properties of poly(1,2-propylene terephthalate). Note the surprising increase in the unnotched Izod impact strength when at least 30 mole percent 1,4-cyclohexanedimethanol is present and the appreciable increase in the notched Izod impact strength when at least 40 mole percent 1,4-cyclohexanedimethanol is present. Copolyesters containing 80 mole percent 1,4-cyclohexanedimethanol (30/70 cis/trans ratio) crystallize in the flask when prepared by the above procedure. Bars molded from the polymer are not clear and therefore undersirable for many end uses. The homopolyester prepared from dimethyl terephthalate and 1,4-cyclohexanedimethanol (30/70 cis/trans ratio) is also not clear and is difficult to injection-mold because its high melting point is near the thermal decomposition temperature of the polymer.

TABLE 1

|  | | | | | 1,4-Cyclohexanedimethanol, Mole% | | | |
| --- | --- | --- | --- | --- | --- | --- | --- | --- |
|  | 0 | 0[a] | 20[a] | 30 | 40 | 50 | 60 | 70 |
| Inherent viscosity of molded bar, dl./g. | 0.50 | 0.56 | 0.53 | 0.57 | 0.62 | 0.58 | 0.64 | 0.66 |
| Yield strength, psi | 8500 | 8700 | 8100 | 7200 | 6300 | 6300 | 6500 | 6300 |
| Break strength, psi | 4800 | 5620 | 5200 | 6300 | 6600 | 6500 | 6800 | 7000 |
| Elongation, % | 113 | 93 | 66 | 135 | 143 | 130 | 134 | 148 |
| Flexural modulus, 10⁵ psi | 3.7 | 3.7 | 3.1 | 2.9 | 2.7 | 2.7 | 2.7 | 2.4 |
| Izod impact strength Notched, ft.-lb./in. | .47 | 0.50 | 0.40 | 0.50 | 1.1 | 1.1 | 1.1 | 1.9 |
| Unnotched, ft.-lb./in. | 5.8 | 6.2 | 5.0 | 44 | 41 | 43 | 44 | 43 |

[a] Polyester prepared with 0.5 mole percent trimethylolpropane to achieve comparable inherent viscosity as other polyesters.

The invention has been described in detail with particular reference to preferred embodiments thereof, but it will be understood that variations and modifications can be effected within the spirit and scope of the invention.

We claim:

1. A composition comprising a copolyester of Components 1, 2 and 3 as follows:
   1. terephthalic acid or derivatives thereof;
   2. from about 30 to about 75 mole percent of 1,4-cyclohexanedimethanol; and
   3. from 70 to 25 mole percent of 1,2-propanediol; said copolyester having an inherent viscosity of at least about 0.40 as measured at 25° C. using 0.5 gram of polyester per 100 ml. of a solvent consisting of 60% by volume phenol and 40% by volume tetrachloroethane.

2. The composition of claim 1 wherein the mole percent of 1,4-cyclohexanedimethanol is from about 40 to about 70, and the mole percent of 1,2-propanediol is from about 60 to about 30.

3. The composition of claim 2 wherein the inherent viscosity is at least about 0.6.

* * * * *